(12) United States Patent
Porter

(10) Patent No.: US 6,979,401 B1
(45) Date of Patent: Dec. 27, 2005

(54) POND SKIMMER APPARATUS

(76) Inventor: C. Bradley Porter, 9115 E. 116th St. South, Bixby, OK (US) 74008

( * ) Notice: Subject to any disclaimer, the term of this patent is extended or adjusted under 35 U.S.C. 154(b) by 8 days.

(21) Appl. No.: 10/757,078

(22) Filed: Jan. 14, 2004

Related U.S. Application Data

(60) Provisional application No. 60/440,155, filed on Jan. 15, 2003.

(51) Int. Cl.$^7$ .............................................. B01D 29/56
(52) U.S. Cl. .................... 210/170; 210/232; 210/416.1
(58) Field of Search ................................ 210/167, 169, 210/170, 232, 416.1, 416.2, 448

(56) References Cited

U.S. PATENT DOCUMENTS

| | | | |
|---|---|---|---|
| 2,900,079 A | * | 8/1959 | Pace ........................... 210/169 |
| 2,996,189 A | | 8/1961 | Salterbach |
| 3,067,879 A | | 12/1962 | Baker |
| 3,152,076 A | | 10/1964 | Kreutzer |
| 3,168,470 A | * | 2/1965 | Rhoda ......................... 210/239 |
| 3,252,576 A | | 5/1966 | Miller |
| 3,428,178 A | | 2/1969 | Nash |
| 3,508,661 A | | 4/1970 | Diemond et al. |
| 3,513,978 A | | 5/1970 | Newsteder |
| 3,788,982 A | | 1/1974 | Zsoldos, Jr. et al |
| 3,815,160 A | | 6/1974 | Baker |
| 3,841,487 A | | 10/1974 | Villette |
| 3,957,634 A | | 5/1976 | Orensten et al. |
| 4,002,566 A | | 1/1977 | Smith |
| 4,035,298 A | | 7/1977 | Cloke et al. |
| 4,059,519 A | | 11/1977 | Zieg |
| 4,127,485 A | | 11/1978 | Baker et al. |
| 4,151,810 A | | 5/1979 | Wiggins |
| 4,348,281 A | | 9/1982 | Perry et al. |
| 4,421,644 A | | 12/1983 | Gedye |
| 4,426,286 A | | 1/1984 | Puckett et al. |
| 4,498,984 A | | 2/1985 | Colson |
| 4,606,822 A | | 8/1986 | Miller |
| 4,627,118 A | | 12/1986 | Baker |
| 4,684,462 A | | 8/1987 | Augustyniak |
| 4,783,258 A | | 11/1988 | Willinger et al. |
| 4,818,389 A | | 4/1989 | Tobias et al. |
| 4,826,591 A | | 5/1989 | Macia |
| 4,915,828 A | | 4/1990 | Meyers et al. |
| 5,083,528 A | | 1/1992 | Strong |
| 5,084,164 A | | 1/1992 | Del Rosario |

(Continued)

OTHER PUBLICATIONS

Aquascape Designs, Inc. Catalog, Winter 2000. Batavia, IL.

(Continued)

*Primary Examiner*—Fred G. Prince
(74) *Attorney, Agent, or Firm*—Terry L. Watt; Fellers, Snider, Blankenship, Bailey & Tippens, P.C.

(57) ABSTRACT

There is provided herein a skimmer apparatus for use in ornamental ponds and the like. According to a preferred embodiment there is provided a skimmer that has a submersible pump directly connected thereto and which is designed to sit within the pond itself, e.g., it might rest on a pond's plant shelf, or might hang by straps or other mechanical means from the pond's edge. Preferably, a submersible pump external to the skimmer body is attached thereto to draw surface water into the skimmer where leaves and other debris will be removed from the water. The submersible pump might either be mounted to a sidewall of the skimmer or mounted to its bottom, the latter being especially appropriate for installation in ponds without plant shelves. The skimmer preferably contains at least a leaf strainer or basket for debris removal.

9 Claims, 4 Drawing Sheets

U.S. PATENT DOCUMENTS

| | | | |
|---|---|---|---|
| 5,085,766 A | 2/1992 | Born | |
| 5,133,854 A | * 7/1992 | Horvath | 210/121 |
| 5,171,438 A | 12/1992 | Korcz | |
| 5,228,999 A | 7/1993 | Yang | |
| 5,242,582 A | 9/1993 | Marioni | |
| 5,277,800 A | 1/1994 | Dieckmann et al. | |
| 5,285,538 A | 2/1994 | Hodak | |
| 5,288,400 A | 2/1994 | Phillips | |
| 5,306,421 A | 4/1994 | Weinstein | |
| 5,328,602 A | 7/1994 | Brooks | |
| 5,490,923 A | 2/1996 | Penney | |
| 5,518,611 A | 5/1996 | Bresolin | |
| 5,554,277 A | 9/1996 | Rief et al. | |
| 5,571,409 A | 11/1996 | Scarborough | |
| 5,584,991 A | 12/1996 | Wittstock et al. | |
| 5,593,574 A | 1/1997 | VanToever | |
| 5,618,428 A | 4/1997 | Oslund | |
| 5,672,271 A | 9/1997 | Dye | |
| 5,759,388 A | 6/1998 | Cote | |
| 5,833,845 A | 11/1998 | Anderson | |
| 5,935,450 A | 8/1999 | Benedict | |
| 5,948,245 A | 9/1999 | Hodak | |
| 6,027,641 A | 2/2000 | Spradbury et al. | |
| 6,048,453 A | 4/2000 | King, Jr. | |
| 6,054,045 A | 4/2000 | Wittstock et al. | |
| 6,063,270 A | 5/2000 | d'Offay | |
| 6,071,403 A | 6/2000 | Usher | |
| 6,180,017 B1 | 1/2001 | Usher | |
| 6,187,181 B1 | 2/2001 | Stoltz et al. | |
| 6,247,194 B1 | 6/2001 | Desjoyaux et al. | |
| 6,274,047 B1 | * 8/2001 | Bates et al. | 210/747 |
| 6,290,844 B1 | 9/2001 | Tennyson, Jr. | |
| 6,299,765 B1 | * 10/2001 | Fabrizio | 210/169 |
| 6,358,425 B1 | 3/2002 | King | |
| 6,398,952 B1 | 6/2002 | Baer | |
| 6,406,621 B1 | * 6/2002 | Bates et al. | 210/170 |
| 6,409,917 B1 | 6/2002 | Malone, Jr. | |
| 6,450,122 B1 | 9/2002 | Frank | |
| 6,461,501 B1 | * 10/2002 | Porter | 210/167 |
| 6,503,391 B2 | 1/2003 | Desjoyaus et al. | |
| 6,527,949 B1 | 3/2003 | Hedberg et al. | |
| 6,533,928 B1 | 3/2003 | Terato | |
| 6,572,765 B2 | 6/2003 | Lincke | |
| 6,627,074 B2 | 9/2003 | Lincke | |
| 6,821,416 B1 | * 11/2004 | Kelly et al. | 210/167 |
| 6,843,910 B1 | * 1/2005 | Thomas | 210/167 |

OTHER PUBLICATIONS

Charleston Aquatic Nurseries. Catalog & Guide. vol. 12, Johns Island, SC. 1998.

* cited by examiner

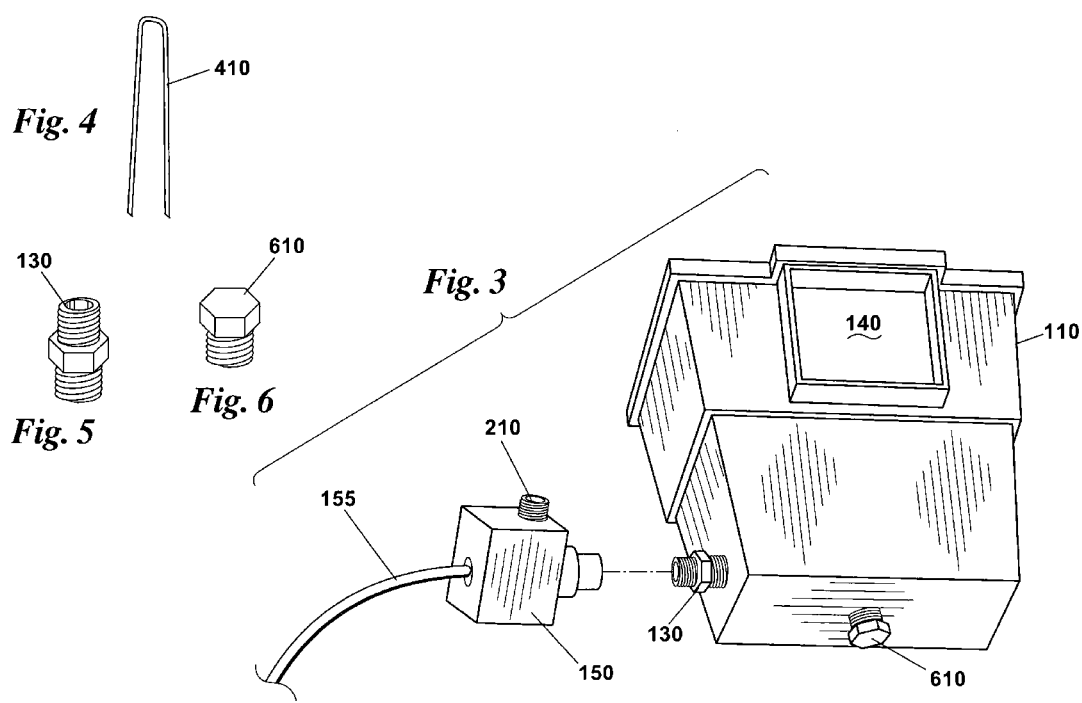

POND SKIMMER APPARATUS

RELATED APPLICATION

This application claims the benefit of U.S. Provisional Patent Application Ser. No. 60/440,155 filed on Jan. 15, 2003.

FIELD OF THE INVENTION

The present invention relates to the general subject matter of maintaining artificial aquatic systems and, more particularly, to methods and apparatus for skimming and filtering or purifying the water in an aquatic life support system such as an ornamental pond.

BACKGROUND OF THE INVENTION

Ornamental pools, ponds, and similar water-filled structures are familiar fixtures in many homes and businesses. These bodies of water provide a pleasant environment for the occupants of the adjacent structure and, in some cases, create habitats for birds, small mammals, and various reptiles and amphibians. However, because these bodies of water are closed systems, some mechanism must be established to keep the water that is contained therein from becoming fouled and stagnant.

In a conventional arrangement, the water in the pond is continuously circulated through some combination of skimmers and filters, thereby reducing the level of particulate mater suspended within the water. Additionally, such water movement is usually designed to oxygenate the water, thereby making it possible for the pond to support aquatic life, such as fish, water plants, amphibians and such.

One filtering apparatus that is commonly used in connection with captive pools is a surface skimmer. As is well known to those of ordinary skill in the art, skimmers are designed to draw surface water from the pond and into its interior where leaves and other floating debris are removed by filtration. The pond water is conventionally drawn into the interior of the skimmer by a submersible pump. Typically, the filtering function of the skimmer is performed by a basket, net, or other strainer which contains a coarse mesh which is designed to entrap the larger particles within the water that pass though it. The particles that have been entrapped within the strainer are then later removed by manually extracting the filtering element from the skimmer and emptying its contents into a waste receptacle.

It is well known to those of ordinary skill in the art that skimmers of the sort that are typically used in ornamental ponds are designed to be installed outside of the pond perimeter. In a conventional arrangement, an externally situated skimmer will be buried in the ground adjacent to the pond with the skimmer mouth at the same level as the normal water level. A pump is then conventionally placed inside of the skimmer body, the function of the pump is to pump water into the skimmer body interior where it can be filtered.

Of course, in a conventional skimmer, absent a continuous source of pond water the pump may empty the skimmer interior, thereby exhausting its source of fluid which can cause the pump to cavitate, which, in turn, can possibly damage the pump. In such a circumstance—and assuming that operating the pump in the absence of fluid has not damaged it to the point of inoperability—it may be necessary to prime the pump before it can be made operable again, which is, at minimum, an inconvenience.

The conventional arrangement, i.e., one where the skimmer is placed outside of the pool, can give rise to a variety of problems. For example, it is customary to line artificial ponds with a thin plastic or rubber pond liner to separate the impounded water from the earth beneath, thereby improving water clarity and decreasing water loss through the contact with the ground. Of course, this liner must somehow be brought up to the mouth of the skimmer and sealed thereto. As is well known to those of ordinary skill in the art, this seal between the liner and the skimmer is subject to failure through poor installation, subsequent failure of the sealing adhesive due to exposure to sunlight or weather extremes, movement of the skimmer within its cavity in the ground, and many other possible factors As a consequence, water leaks through an imperfect seal between the skimmer and the pond liner are a frequent source of water loss and resultant aggravation to the owner.

In another common arrangement, a floating skimmer is utilized, wherein skimmer is largely free to float about the surface of the pond. In such an arrangement, the pump would typically be situated on the bottom of the pond and would be placed in fluid communication with the floating skimmer portion via some length of flexible plastic tubing. However, such arrangements have the disadvantage that the skimmer might be situated near the center of the pond when time comes to remove debris from it. Further, placement of the pump on the bottom of the pond makes it relatively inaccessible if a need for service arrives.

Heretofore, as is well known in the ornamental ponds arts, there has been a need for an invention to address and solve the above-described problems. Accordingly, it should now be recognized, as was recognized by the present inventor, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided hereinafter a new skimmer apparatus for use in ornamental ponds and the like. According to a first preferred embodiment there is provided a skimmer which is designed to sit within the pond itself, e.g., rest on a pond's plant shelf, or hang by straps or other mechanical means from the ponds edge. In a preferred arrangement, a submersible pump is attached directly to the exterior of the skimmer body to draw surface water into said skimmer for purposes of removing leaves and other debris from the water. In a first preferred variation, the submersible pump is mounted to a sidewall of skimmer at a point below the waterline. Such a configuration would be particularly suitable for plant shelf installations. In another variation, the pump is mounted directly to the bottom of skimmer for installation in ponds without plant shelves. The skimmer preferably contains a leaf strainer or basket for debris removal.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Further, the disclosure that follows is intended to apply to all alternatives, modifications and equivalents as may be included within the spirit and scope of the invention as defined by the appended claims. Finally, it should be understood that the phraseology and terminology employed herein are for the purpose of description and should not be regarded as limiting, unless the specification specifically so limits the invention.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which:

FIG. 3 illustrates in greater detail the embodiment of FIG. 1.

FIG. 4 contains an illustration of preferred anchor for use in suspending the instant invention above the floor of a pool or pond.

FIG. 5 illustrates a connector suitable for use in connecting a submersible pump to the instant skimmer invention.

FIG. 6 contains an illustration of a plug for use with the instant invention.

DETAILED DESCRIPTION OF THE INVENTION

According to a preferred aspect of the instant invention, there is provided a water surface skimmer suitable for use, for example, within ornamental ponds and the like, wherein the skimmer is installed inside of the pond and wherein its pumping element is exterior to the skimmer body and directly attached thereto such that the pumping element is situated beneath the surface of the water.

GENERAL BACKGROUND

Most ponds are excavated in such a way that tiers or stair like shelves are created within them. This accomplishes several things, one being that the required pool depth can be reached without having to excavate the entire area to one specific depth, (i.e., less digging is required). This also creates ledges that are covered in water to varying water depths, such ledges being particularly suitable for the placement thereon of potted water plants, which might require varying depths of water in order to thrive depending on the plant species.

Residential water features are becoming increasingly popular with gardeners and homeowners and those of ordinary skill in the art will recognize that it is necessary to provide some sort of filtration to remove debris from the water, thereby enhancing the environment for aquatic life in the pond, such as fish, water plants, amphibians and the like. Without oxygenation and filtration, both mechanical and biological, ponds may become fouled or stagnant with well known consequences for the life resident therein.

One filtering apparatus that is commonly used in connection with captive pools is a surface skimmer. A surface skimmer is designed to draw surface water from the pond into its interior where leaves and floating debris are removed by passing the incoming surface water through a porous basket or a net, thereby capturing floating detritus for removal. In the ornamental pond industry it is customary to use a submersible pump which is positioned within the skimmer to draw water into the skimmer for filtering.

PREFERRED EMBODIMENTS

Figure 1:
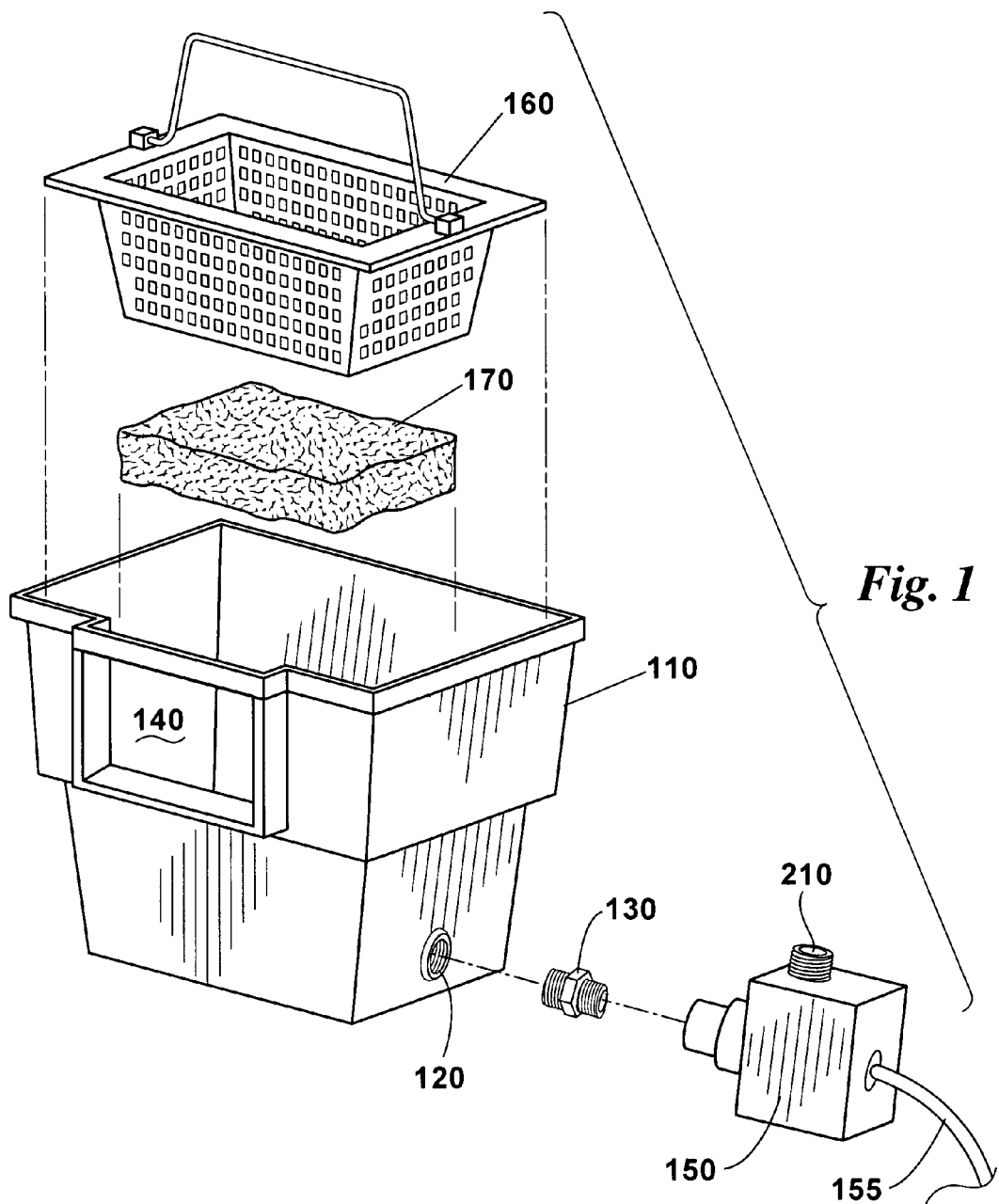
FIG. 1 illustrates a preferred aspect of the instant invention, wherein the submersible pump is mounted to side of skimmer.

Turning first to FIG. 1, wherein a preferred embodiment of the instant invention is illustrated, there is provided a skimmer which is designed to be situated within the confines of an ornamental pond. As can be noted from this illustration, in a first preferred arrangement the pumping element 150 is situated externally to the skimmer body 110 and is directly connected thereto. As will be made clearer in subsequent figures, the preferred pump 150 is of the submersible variety and will be directly nated to the skimmer body in such a way that during operation it is below the water level in the pond.

In a preferred arrangement, and as is discussed in greater detail hereinafter, the preferred skimmer 110 will have multiple openings 120 or ports (best seen in FIG. 2) to which a submersible pump 150 may be connected, preferably using ordinary mechanical fittings (e.g., via connector 130 best seen in FIG. 5). The location of the ports will be selected such that, upon attachment of a compatible pump 150, water is drawn into the interior of the skimmer 110 through the skimmer aperture 140 and pulled downward through a leaf basket 160 or similar coarse straining device, by suction created by the pump 150 which is positioned below or lower than strainer basket 160 and skimmer window 140. Additionally, optionally a filter medium 170 (e.g., a filter mat) could optionally be included within the skimmer basket 160 to increase the amount of material that is removed from the water that is drawn therethrough. Note that in the preferred arrangement the strainer basket 160 (is designed to rest fully within the skimmer body 110 and be sized such that all of the water that enters the skimmer 110 must pass through it. As is well known to those of ordinary skill in the art, an objective of such baskets 160 is to trap larger particles that fall or are blown into the pond water, e.g., leaves, sticks, acorns, and other windblown debris, before these foreign items become saturated with water, lose buoyancy, and sink to the bottom of the pond where they become more difficult to remove. The holes in the skimmer basket 160 are typically of a size as to trap the larger particles while creating a minimum restriction of the flow of water through the skimmer system. The leaf basket 160 is conventionally designed for easy, unobstructed removal so that it can be frequently emptied and cleaned.

Figure 7:
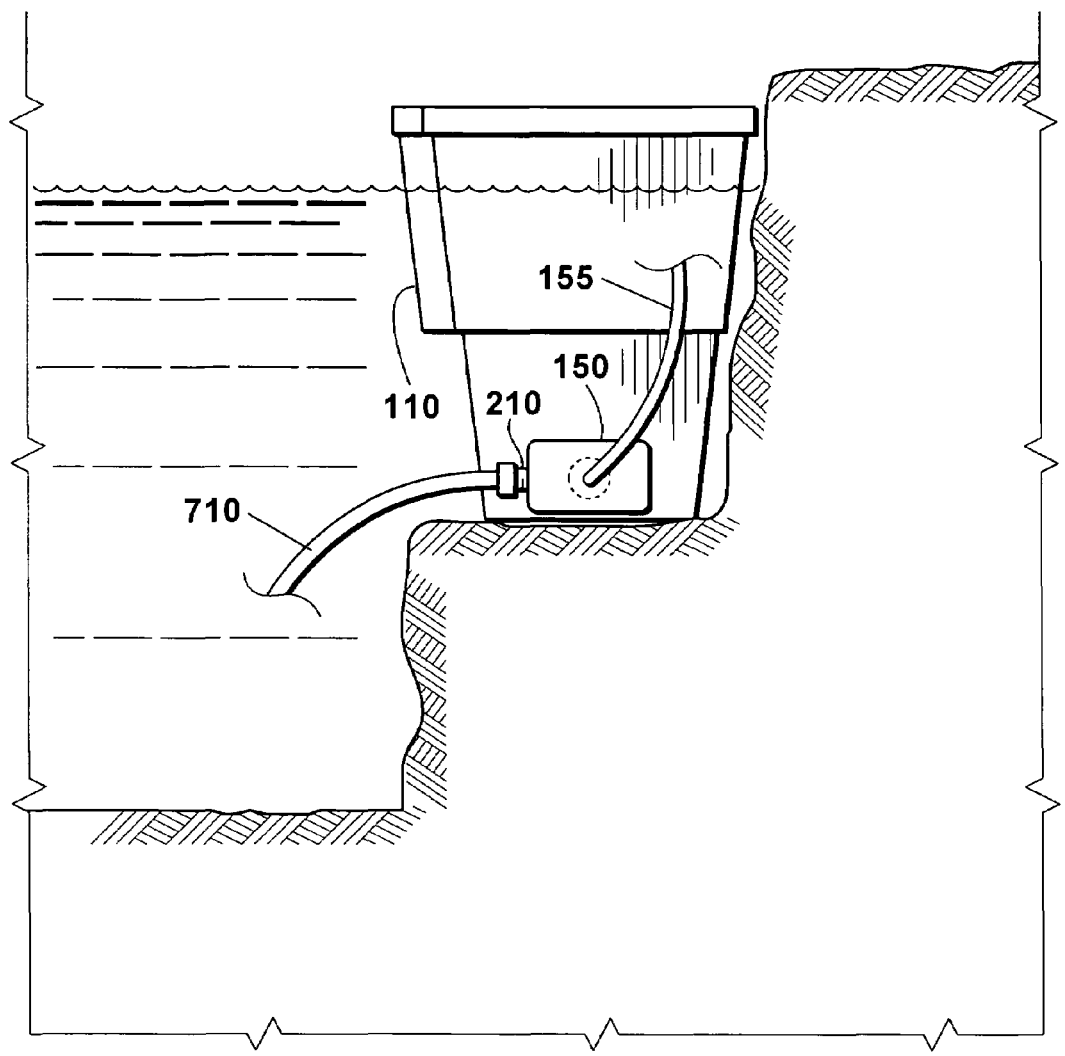
FIG. 7 illustrates a preferred embodiment of the instant invention as it might appear when installed on a plant step within a pond or pool.

In the event that a side mounted pump 150 is utilized (e.g., FIG. 1), the skimmer 110 is preferably of such dimensions to permit it to be rested on a plant shelf or terrace within the ponds perimeter (e.g., as is illustrated in FIG. 7). Ports that are not currently in use will preferably be blocked (e.g., by using plug 610, FIG. 6) to prevent subsurface water from entering skimmer via an open aperture 120.

Figure 2:
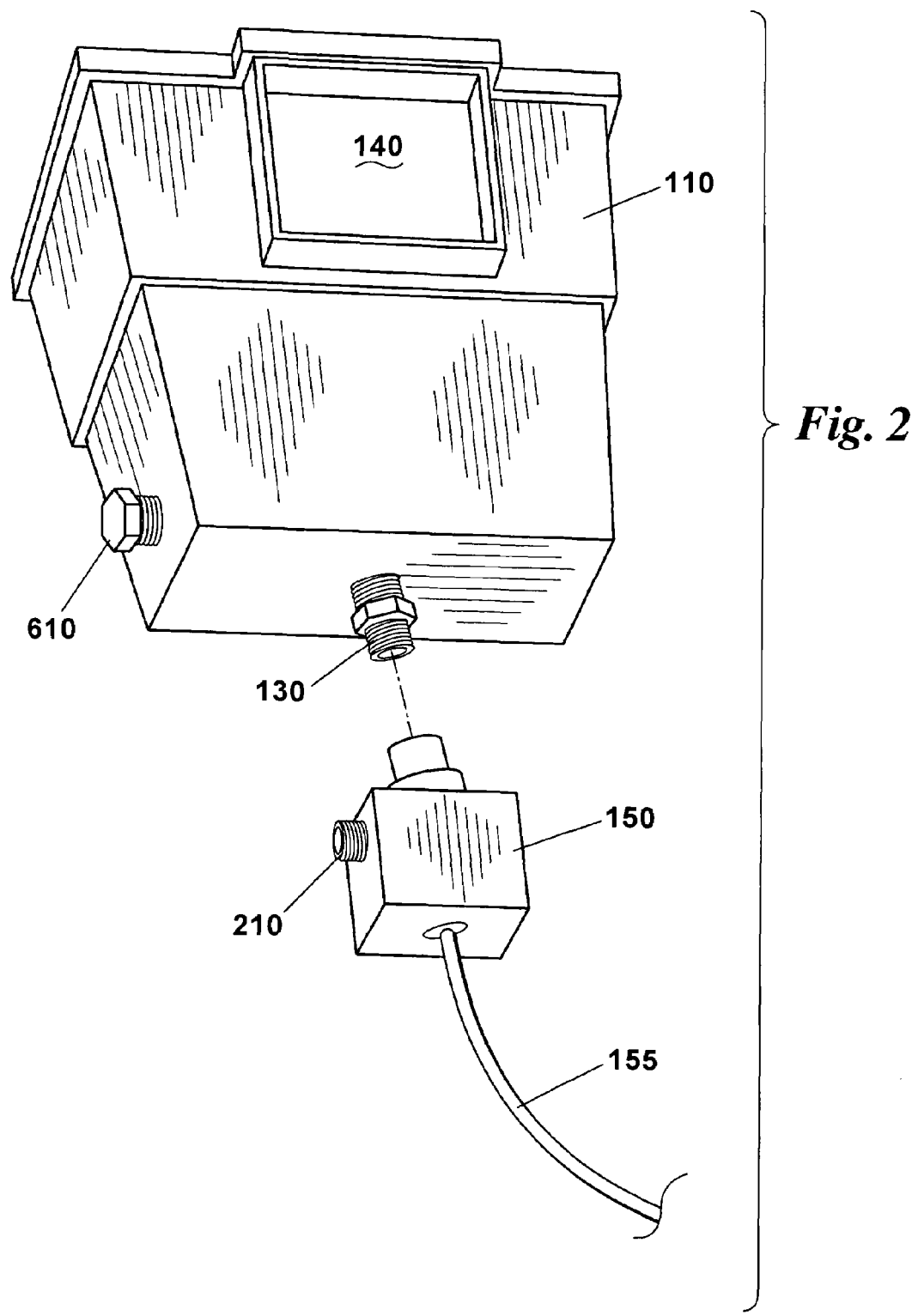
FIG. 2 contains an illustration of another preferred aspect of the instant invention, wherein the submersible pump is mounted to bottom of skimmer.

As is illustrated in FIG. 2, there are many different arrangements of the instant invention. In a first preferred configuration, the pumping element 150 of the instant invention is situated underneath the skimmer body 110 and connected directly thereto. Thus, when the skimmer 110 is installed inside of the pond, the pumping element will be effective and continue to draw water so long as there is sufficient water to reach the intake aperture of the skimmer. When attached in this fashion, the skimmer 110 may be lowered into the water at the pond's perimeter and maintained at a constant water depth through the use of straps or other such materials as cables, pins, ropes or the like. In one preferred arrangement, pin 410 is inserted into the ground adjacent to the pond and one ore more straps affixed thereto. The other ends of the straps will be affixed to the skimmer 110 preferably along its upper periphery, e.g. at a protrusion provided for such a purpose proximate to its upper periphery (not shown in FIG. 2). In another arrangement, one end of the strap or straps will be looped about the upper periphery of the skimmer body 110 and the other secured to pin 410 or some other relatively immobile object. In FIG. 1, the rim that encircles the upper perimeter of skimmer 110 could serve to keep the skimmer from slipping through the restraining straps.

Thus, in this embodiment the skimmer 110 may be positioned in the water at any arbitrary depth, with the straps serving to hold it at the chosen depth as the pool water level falls and rises. Preferably, the skimmer 110 will be located at a depth that allows water to enter through the skimmer opening 140. Additionally, the height above the bottom of the pond can be adjusted by varying the length of the straps, thereby controlling the level of water that enters the skimmer aperture 140. This configuration is particularly suitable for use in ornamental ponds which do not have plant shelves. In addition to holding the skimmer 110 at a predetermined depth, the straps further act to prevent the skimmer 110 from floating out of position and into the middle of the pool through the force of wave and/or wind action and, if the skimmer 110/pump 150 combination has negative buoyancy, the straps also keep it from sinking to the bottom of the pond.

As has been discussed previously, unused ports within the skimmer 110 are preferably closed prior to operating it within a pond. It should be clear that when the attached pump is operating water is drawn through the skimmer window by suction 140. Water that is pulled into the pump 150 is preferably discharged via discharge orifice 210 and piped through an external filter before returning that water to the pond body via a waterfall or some other ornamental feature.

As can best be seen in FIG. 2, in a preferred arrangement the submersible pumping element 150 is attached to the base of the skimmer body using a threaded connection. As should be clear, a variety of pumps of different capacity may be connected to the exterior of skimmer body 110 via the preferred threaded fittings illustrated in this figure, but those skilled in the art to which this invention pertains, will be able to devise other methods of affixing such pumps to skimmer boxes, preferably with clamps, twist/lock devices, cam lever locks, or any other such connect/disconnect system.

In FIG. 3, a preferred embodiment is illustrated wherein the pumping element 150 is attached directly to the side of the skimmer body. Once again, preferably, the connection will be via an internally threaded connector which is used in conjunction with connecting element 130. The preferred internal threading within the wall of the skimmer 110 that facilitates the use of connector 130 is best seen in FIG. 1.

As is best illustrated in FIG. 7, a preferred method of installing one embodiment of the instant invention within the confines of an ornamental pond is to rest it on a step, plant shelf, or other shallow support surface within the pond body. Supplying the pumping apparatus 150 with electrical power via electrical line 155 will cause it to begin moving water through the skimmer 110, thereby causing leaves and other surface debris to be sucked into the skimmer 110 where they will be trapped within the basket 160 for easy removal.

FIG. 7 illustrates in greater detail a typical placement of a preferred embodiment of the instant invention during its installation. As should be clear from this figure, the skimmer 110 should be supported at a level within the pond such that the water surface falls within the limits of the skimmer window 140. Also apparent in this figure is the discharge orifice 210 to which is typically connected tubing so that water may be conducted away from the skimmer 110 so that it can be further filtered, or returned to the pond in the form of waterfall or fountain. Note that the negative buoyancy of the unit 110 tends to keep it in place during operation but that preferably the unit will be additionally anchored via a mechanical anchoring system similar to that illustrated and discussed previously and hereafter.

CONCLUSIONS

There has been provided herein a new system for skimming debris and leaves from the surface of ornamental ponds which utilizes a submersible pump that is directly attached to a skimmer body. Note that the instant inventor has specifically contemplated many variations of the particular embodiments discussed herein. For example, note that the term "leaf basket" or "strainer" should be interpreted in its broadest sense to include rigid plastic, as well as woven nets suspended on wire frames, wire baskets, or any other arrangement which provides, at minimum, coarse filtering of the larger pond water debris.

Additionally, note that although the preferred skimmer body of the instant invention has been generally illustrated herein as having a box-like shape, it could in fact be provided in any number of alternative shapes to accommodate, for example, different shapes of baskets, nets, and the like. For example, the skimmer body could be rounded, conical, low profile, or any number of other geometric shapes. The skimmer box itself could be made of any number of different materials including, without limitation, materials such as plastic, metal, composite material, foam, wood, or others.

Thus, it is apparent that there has been provided, in accordance with the invention, a patient sensor and method of operation of the sensor that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A skimming apparatus for use in removing surface debris from a captive body of water, comprising:
   (a) a skimmer body having an interior, an upper portion, and a lower portion, said skimmer body positionable to be within the captive body of water, wherein
      (a1) said upper portion of said skimmer body contains at least one intake aperture for receiving surface water from the captive body of water, and,
      (a2) said lower portion of said skimmer body contains at least one discharge aperture in a side of said upper portion for removing water from said interior of said skimmer body;
   (b) a submersible pump external to said skimmer body interior and positionable to be directly connected to said lower portion thereof, said submersible pump having at least an intake orifice and a discharge orifice, said intake orifice being in fluid communication with said discharge aperture of said skimmer body and in fluid communication with said interior of said skimmer body, said submersible pump at least for removing water from said skinner body interior via said discharge aperture; and,
   (c) a porous filter positionable to be within said skimmer body interior for receiving and filtering water drawn into said interior of said skimmer by said submersible pump.

2. A skimming apparatus according to claim 1, wherein said captive body of water has at least one ornamental plant shelf therein and wherein said skimmer body is positionable to be sat on said ornamental plant shelf.

3. A skimming apparatus according to claim 1, wherein said skimmer body has a plurality of discharge apertures.

4. A skimming apparatus according to claim 3, wherein said skimming apparatus has a bottom panel, and wherein at least one of said plurality of discharge apertures is located within said bottom panel.

5. A skimming apparatus according to claim 3, wherein said skimming apparatus has at least one side panel, and wherein at least one of said plurality of discharge apertures is located within one of said at least one side panels.

6. A skimming apparatus according to claim 3, wherein any of said discharge apertures not connected to said submersible pump is configurable to be blocked to prevent the flow of water therethrough.

7. A skimming apparatus according to claim 1, wherein said porous filter comprises a coarsely porous basket positioned within said skimmer body upper portion.

8. A skimming apparatus according to claim 7, wherein said porous filter further comprises a filter mat.

9. A skimming apparatus according to claim 1, wherein said submersible pump discharge orifice is in fluid communication with the captive body of water.

* * * * *